(No Model.)  3 Sheets—Sheet 1.

C. N. WILCOX.
AUXILIARY POWER MECHANISM FOR ROCKING AND SWINGING APPARATUS.

No. 467,842. Patented Jan. 26, 1892.

WITNESSES:
Raphael Netter
A. W. Almquist

INVENTOR
Curtis N. Wilcox (No Model.) 3 Sheets—Sheet 2.
C. N. WILCOX.
AUXILIARY POWER MECHANISM FOR ROCKING AND SWINGING APPARATUS.
No. 467,842. Patented Jan. 26, 1892.
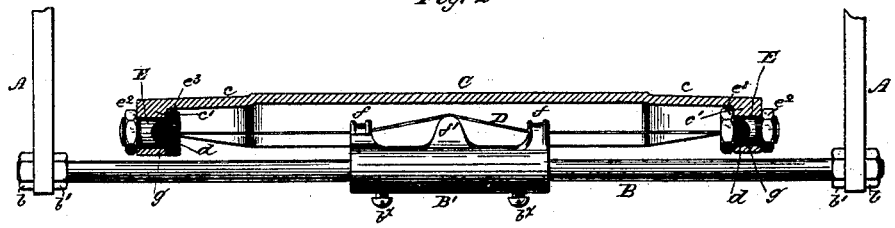
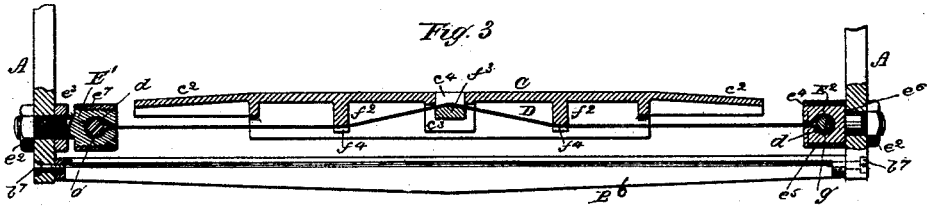
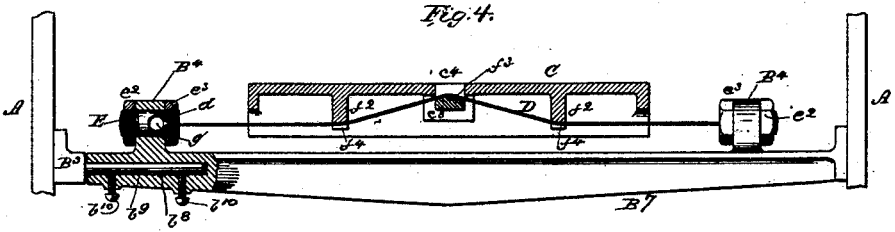
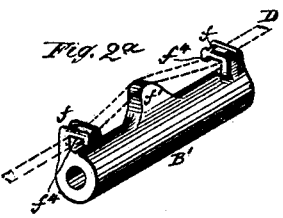
WITNESSES: INVENTOR (No Model.) 3 Sheets—Sheet 3.
C. N. WILCOX.
AUXILIARY POWER MECHANISM FOR ROCKING AND SWINGING APPARATUS.
No. 467,842. Patented Jan. 26, 1892.
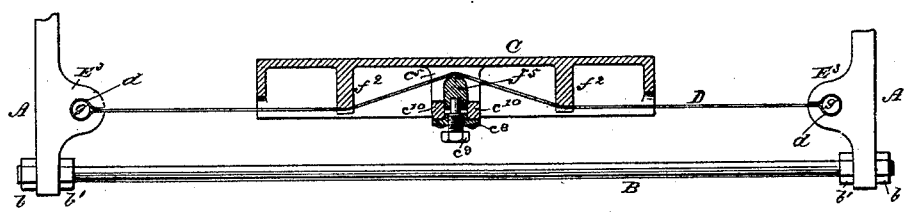
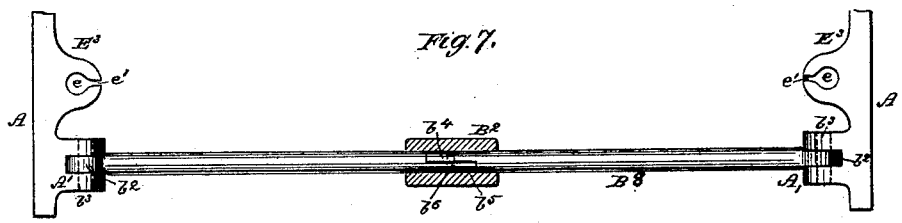
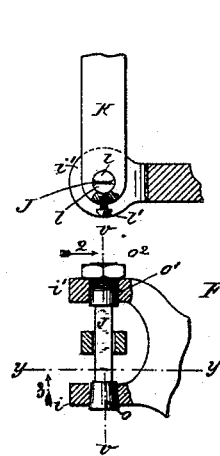
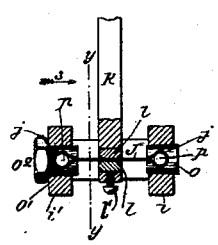
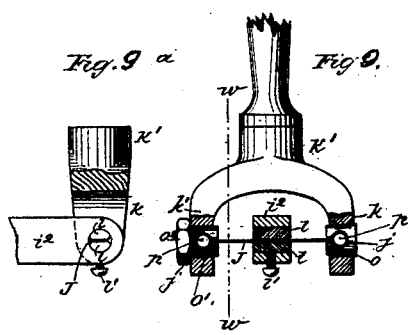
WITNESSES:
Raphael Netter
A. W. Almqvist
INVENTOR
Curtis N. Wilcox

UNITED STATES PATENT OFFICE.

CURTIS N. WILCOX, OF BROOKLYN, NEW YORK, ASSIGNOR TO DEBORAH C. FOLK, OF SAME PLACE.

AUXILIARY POWER MECHANISM FOR ROCKING AND SWINGING APPARATUS.

SPECIFICATION forming part of Letters Patent No. 467,842, dated January 26, 1892.

Application filed November 15, 1888. Serial No. 290,946. (No model.)

*To all whom it may concern:*

Be it known that I, CURTIS N. WILCOX, of the city of Brooklyn, in the county of Kings and State of New York, have invented certain Improvements in Auxiliary Power Mechanism for Rocking and Swinging Apparatus, of which the following is a specification.

My invention relates to apparatus in which the operator produces for work, pleasure, or exercise a rocking or swinging motion, and is more especially designed for sewing-machine stands, but is also applicable, in whole or in part, to other stands for power purposes, to cradles, swings, rocking-chairs, vibrating chairs, tilting-chairs, and other rocking or swinging apparatus.

The invention consists, primarily, in the combination, with a supporting-frame and a treadle or equivalent device, of an intermediate tensioned treadle-supporting torsion-spring and bearings over and under which the spring extends in zigzag course between the points where its tensioned ends are secured. By this means I am enabled to secure the treadle firmly in place relatively to the supporting-frame without the aid of other fastenings whatsoever. By the term "treadle" I mean not merely the conventional treadle, but any appliance—such as a plate, lever, or other device—through the instrumentality of which, when connected to the spring, torsional strain can be exerted upon said spring, and when said term is hereinafter used, particularly in the claims, I desire to be understood as using it in this broad sense.

The invention also consists in means for securing the ends of the tensioned torsion-spring which are designed to effect this object without perforation or cutting of the spring, said means comprising, essentially, an eye formed on the end of the spring, in combination with a holder having a cavity or seat to receive the eye and a slot for the passage of the end of the spring on which said eye is formed, and a pin or plug which is inserted in and fills said eye. These are the more prominent features of my invention. They, together with other features, can best be explained and understood by reference to the accompanying drawings, in which, for the sake of illustration, I have represented my improvements as applied to a sewing-machine stand.

Figure 1 shows a perspective view of a sewing-machine stand; V V, its two legs, supporting a table U, which, together with the usual back brace X, holds such legs in position at the top, while at the bottom they are held in position by the lower part of the brace X and an under brace B, secured at each end by a screw $b^7$ to a middle portion A of each of the legs V V. C is a treadle attached and supported by a flat torsion-spring D, fastened at one end to a shoulder-bolt $E^2$ and at the other end to a bolt E', both bolts being held to the legs at A A, respectively, by nuts $e^2$ $e^2$, one of which prevents the shouldered nut $E^2$ from turning on its axis, while the other, in conjunction with an inner check-nut $e^3$, serves a similar purpose for the bolt E'. The treadle C is provided at its forward or toe end with two projections $i\ i'$, between which is held another flat torsion-spring J, to which one end of a pitman K is attached, the other end connecting with a crank Q on a fly-wheel W.

Figs. 2, 3, 4, 6, and 7 are longitudinal vertical sectional views illustrating different forms or modifications of the braced support for the treadle-operating spring and treadle, said figures showing also the treadle, spring, and fastenings for both in various forms, as will be hereinafter more fully explained.

Fig. $2^a$ is a perspective view of part of the braced support and flat spring D shown in Fig. 2.

Fig. 5 is a plan view of the flat spring D shown in Figs. 3, 4, and 6 with its middle wedge.

Fig. $3^a$ is a detail view of one of the bolts in Fig. 3 for holding the spring end.

Fig. 8 is a sectional detail view on line $z\ z$ of Fig. 1 of a portion of a treadle with pitman-spring and pitman end, with their connections, Fig. $8^a$ being a sectional detail on line $v\ v$ of Fig. 8 in direction of arrow 2, and Fig. $8^t$ a section taken on line $y\ y$ of Figs. 8 and $8^a$ seen in direction of arrow 3.

Fig. 9 is a sectional view, and Fig. $9^a$ a section on line $w\ w$, of Fig. 9, showing a slightly-modified arrangement of the pitman-spring, pitman, and treadle, with connections, from that shown in Fig. 8.

Figure 1:
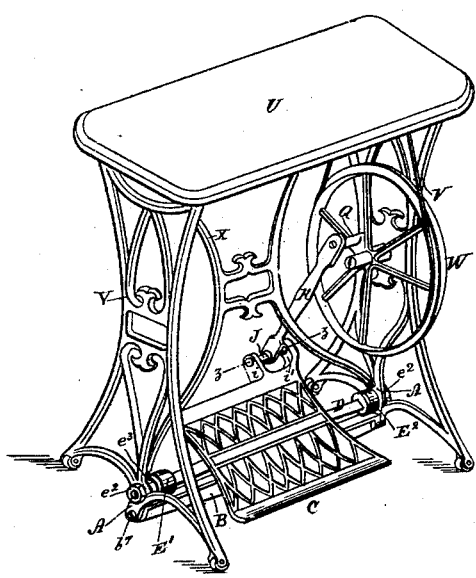

The brace-support for the spring and treadle has in each instance (referring now to Figs. 2, 3, 4, 6, and 7) two sides A A; but the cross bar or brace holding them apart varies in construction, attachment, and arrangement. Thus in Figs. 2 and 6 it is shown as a round rod B, threaded at its ends and secured to the sides A A by outside nuts $b\ b$, screwed upon it, and inside check-nuts $b'\ b'$. In Figs. 3 and 4 it is shown as a ribbed cast brace $B^6$ and $B^7$, attached to the sides A A by screws $b^7\ b^7$ in Fig. 3, or in any other suitable manner. In Fig. 7 it is shown as a rod $B^8$, having its two ends $b^2\ b^2$ attached by pivots $b^3\ b^3$ to two lugs A' A' in the sides A A, the middle of the rod having toggle-joints $b^4\ b^5$, connected by a pin $b^6$, so that the jointed part may be swung horizontally outward and inward upon the pivots $b^3\ b^3$, a sleeve $B^2$ being slid over the jointed part and secured there by a set-screw or other suitable means when it is desired to keep the rod straightened and rigid between its supports A' A'. In Figs. 2, 3, 6, and 7 the bar or brace is entirely below the line of the spring, so that the tensioning of the latter would tend to draw that part of the sides A A located above the spring toward each other unless prevented by a second brace above the line of the spring. In Figs. 2 and 4 the necessity for such second brace is avoided by providing the brace itself with supports for the spring in lieu of attaching the spring to the sides A A; but in all the cases it will be seen that the brace B is in near proximity to the spring and substantially in line therewith for the purpose of securing for it the strongest position and construction for resisting the tensioning strain of the spring and preventing any variation in the tension.

In Figs. 3 and 6 the spring is tensioned between the sides A A, and in Fig. 7 it is designed to be similarly tensioned. In Fig. 2, however, it is tensioned between the two sides of the treadle, while in Fig. 4 the brace is provided with two projecting supports $B^4\ B^4$ near its ends, (between which supports the spring is tensioned,) and is also constructed with one end $B^3$ separate from the main part and having an inward projecting portion $b^9$ to slide longitudinally within a corresponding bore $b^8$ in such main part, so that the brace may thus be extended or shortened at pleasure and its length fixed by set-screws $b^{10}$ or other suitable means.

This form of brace is especially desirable for attachment to stands already constructed and which are of various width between their side supports. Where the spring is tensioned in the treadle, the bearings over which it is caused to pass or extend in zigzag course are formed on or attached to the supporting-frame or some part connected therewith. For example, in Fig. 2, (where the spring is tensioned in the treadle,) the brace B supports the spring by means of a sleeve B', (see, also, Fig. $2^a$,) adapted to slide longitudinally over such brace and fastened to it by set-screws $b^x\ b^x$, such sleeve being provided at its middle with a bearing projection $f'$, (upon the upper surface of which the under side of spring D is designed to rest,) and at or near its ends, but below the surface-line of projection $f'$, with two outer bearing projections $f\ f$, of hook form, under and within which the spring D is designed to be held, the hooks being suitably recessed to retain the spring (and thereby its treadle) in line with the sleeve (and entire cross-brace) and prevent it slipping outward in either direction. The spring may be readily attached to this support before tensioning the spring at its ends by simply passing it under one hook, over the middle projection, and under the other hook, and then tensioning the spring at its end support or supports, which operation wedges its middle portion securely between the hooks holding downward against its upper side and the middle projection bearing upward against its under side. A somewhat similar method of securing the treadle in suitable relation with the braced support is shown in Figs. 3, 4, and 5. In these figures, as well as in Fig. 8, the spring is tensioned in the supporting-frame or some part rigidly connected therewith, and consequently the bearings over which it extends in zigzag course are on the treadle. Thus in Figs. 3 and 4 the treadle is provided on its under side with two end projections or bearings $f^2\ f^2$, each also with a suitable recess $f^4$, to retain the spring from outward slide-slipping, while a middle opening $c^4$, extending upward through the treadle, permits of curving the middle portion of the (untensioned) spring upward therethrough sufficiently far to insert under it a wedge or stop $f^3$, (forming the middle bearing,) the ends of which drop down against a shoulder $c^3$ on each side (front and rear) of the opening $c^4$, the upper surface of such stop bearing upward against the under side of the spring and the under surface of the projections $f^4\ f^4$ bearing downward against the upper side of the spring, and the middle bearing being above the line of the two outer bearings, thus causing the treadle to be securely wedged in position upon the spring when the latter is suitably tensioned at its ends.

In Fig. 6 the treadle is provided with projections $f^2\ f^2$, as in Figs. 3 and 4; but in lieu of the opening $c^4$ shown in those figures there is a middle under opening $c^5$, through which the middle portion of the spring may be passed, when, by inserting from beneath a wedge or tongue $f^5$, (constituting the middle bearing,) arranged to slide vertically in guides $c^{10}\ c^{10}$ formed in a middle projection of the treadle at the sides of the opening $c^5$, and sufficiently turning one or more screws $c^9$, upholding said tongue $f^5$ and supported by a plate $c^8$, secured to said middle projection, the spring at its middle may be forced upward and thereby tensioned between its fixed supports $E^3\ E^3$, instead of being tensioned at its ends, as shown in the other views, except in Fig. 7. In this latter figure by estimating beforehand the exact length of tensioned spring and fixing it accordingly the spring may be inserted in the fixed supports (in the manner hereinafter explained) by sliding the sleeve $B^2$ away from the jointed part of the rod $B^3$, which may then be swung outward, thus drawing inward toward each other the side supports A A sufficiently to enable the ends of the untensioned spring to be attached thereto, when, such being done, by pressing the jointed part of the rod inward until it is straight the sides A A will be thereby forced apart and the spring be thus tensioned, the sleeve $B^2$ then, by being slid over the jointed part and there secured, holding the sides A A in such position and the spring at such tension.

To securely attach the ends of the flat spring D to their supports, to prevent the slipping and loosening of such ends therefrom and consequent impairment of the tension of the spring and to avoid weakening the spring (as by holes in it) or impairing its temper for torsional operation or strength for support, I form the ends of the spring each into an eye $d$, (see Figs. 2, 3, 4, 5, and 6,) insert such eyed end into a holder having a corresponding hole or seat $e$ and mouth or slot $e'$, and then insert a pin or plug $g$ into such eye to wedge the eyed end of the spring against the tensional strain of the latter. In Figs. 6 and 7 the seat and slot $e$ and $e'$, respectively, are made in inward projections $E^3$ $E^3$ from the side supports A A. In Figs. 2, 3, $3^a$, and 4 they are made in bolts, (E in Figs. 2 and 4 and $E'$ $E^2$ in Figs. 2 and $3^a$,) said bolts designed to be attached by nuts or otherwise to fixed supports; $c'$ $c'$, portions of the treadle in Fig. 2; A A, portions of the legs in Fig. 3; $B^4$ $B^4$, projections from the brace in Fig. 5; and to obviate any liability of the springs' ends working sidewise out of the eye and mouth, I prefer to make that part of the bolts in which the eye and mouth are of a diameter the same or a trifle larger than the width of the spring, so that the spring end may be entirely within the bolt or not projecting sidewise outside of the bolt, and then to inclose that part of the bolt sufficiently within a covering that shall serve as a stop to any side working of the spring. Thus in Figs. 2 and 4 the projecting fixed supports $c'$ $c'$ and $B^4$ $B^4$, respectively, are cavitied for the admission of the bolts E, so that when the latter are drawn to their required positions by the nuts $e^3$ the eye and mouth are entirely within and covered by such supports and the check-nuts $e^3$. In Fig. 3, however, the bolt $E^2$ is made with a shoulder $e^4$ as a stop to a ferrule $e^5$, incasing the bolt, the outer end of which ferrule, together with shoulder $e^6$ of the bolt, serving as a check in conjunction with the adjacent nut $e^2$ to prevent the bolt $E^2$ (and contained spring) from turning upon its axis after the spring is adjusted at its required angle of inclination for torsional action, while the bolt $E'$, which I use as the tensioning-bolt, (after bringing $E^2$ to its position,) drawing the spring by it to the desired tension by adjacent nut $e^2$ and securing it from turning from its desired position by check-nut $e^3$, I cover with a nut $e^7$, screwed over the part holding the eyed end of the spring, which part of the bolt is correspondingly threaded for that purpose.

The treadle C in Fig. 3 is provided with lateral projections or guards $c^2$, extending over the spring toward the supports A A to cover and protect the spring from contact with the operator's feet or clothing or other possible liability to injure or be injured by external objects that may strike against it; and in Fig. 2 the treadle has lateral extensions $c$ from its middle portion to insure a greater distance between the end supports of the spring, and thus enable a longer spring to be used with a consequent longer torsion, or, in other words, permitting its torsion to extend over a greater length of spring. The spring is preferably arranged with its flat surface substantially horizontal or at right angles to the line of weight pressure or force exerted by the operator upon the treadle, in order that such pressure or force may be directed against the greatest flexibility and elasticity of the spring, and the operator thereby receives the greatest advantage derivable therefrom, rather than to encounter the rigidity of the spring if it were set on edge, or the lesser degree of elasticity from any other direction than the one above indicated, as preferred; or, otherwise expressed, I prefer such horizontal position of the spring in order that the resistance of the wheel or connecting mechanism or work beyond may be graduated and softened when it reaches the operator, and that the fatiguing and injurious jar and concussion that are ordinarily produced may be avoided as far as possible.

To protect the spring from liability to rust, a coating of asphalt varnish may be given to it.

In attaching and adjusting the actuating-spring to its fixed supports (either directly or through intermediate movable supports, as the case may be) I arrange the spring, preferably, at such angle torsionally or transverse inclination that its torsional action, dependent upon the extent of rocking or swinging movement of the treadle, will be exerted substantially alike or equally in each direction of such movement, thus reducing such action to its minimum requirement and preserving greater uniformity of torsional resistance and action on opposite sides. This arrangement, in case of the flat spring, may be produced either by setting the spring with its edge pointing to the arc of movement of the treadle at a point midway in such arc or by setting the flat spring transversely at a right angle to a line intersecting such arc midway.

Referring now to Figs. 8, $8^a$, and $8^b$, $i$ and $i'$ represent two projecting forks of the treadle sufficiently far apart to allow of desired length of spring for the needed torsion, one fork $i$ being bored taper to hold the taper bolt or plug $o$, and the other fork $i'$ being straight to hold the straight and threaded bolt or plug o', the flat spring J having its ends formed into eyes j j, and such eyed ends respectively held by two eyes and mouths formed in the plugs o o and wedged therein by pins p p in substantially the same manner as heretofore described for securing the ends of spring D, except that to tension the spring J, of which very slight torsional action is usually required, (to permit of the oscillation of the pitman,) the screwing of nut $o^2$ upon the threaded part of plug o' first draws the taper plug o to a tight bearing in its taper socket and then wedges itself so firmly against the outside of fork i' as to prevent the loosening and turning of either plug in its socket after the spring is placed in desired torsional position for operation. K is (one end of) a pitman with a circular hole in which rest two semicircular clamps l l, preferably chamfered at the edges of their flat surfaces, between which the spring J is passed, and the pitman and spring held securely together by a set-screw l', passing into the end of the pitman against the under clamp and wedging the two clamps and spring to prevent slipping of the pitman along the spring and out of its required position in line with the crank Q upon fly-wheel W. In lieu of a single-ended pitman and a forked-ended treadle, just referred to, I show in Figs. 9 and $9^a$ a modification, the pitman K having two forks k k' holding the eyed ends j j of the spring J, wedged by pins p p in plugs o o', while the treadle has but a single projection $i^2$, (between the two forks of the pitman when connected,) having a circular hole in which the spring is secured by clamps l l and set-screw l', substantially as already described in the other (and preferred) form shown in Figs. 8, $8^a$, and $8^b$. The spring (either actuating or pitman) may, if desired, be screwed at one end to a stationary support—as, for instance, $e^3$ in Figs. 6 and 7—and the other end only be attached to a bolt or other adjustable or tensioning support. I arrange the flat pitman-spring (like the treadle-actuating spring) preferably in a substantially horizontal position, or with its flat surface (rather than its edge) toward the wheel-crank, in order to benefit the operator by its maximum elasticity in meeting or receiving and softening such resistance as may be caused by the wheel or the mechanism that may be attached thereto or the work performed, and, in addition thereto, I arrange the pitman-spring in the treadle connection or connections preferably at such angle of inclination transversely relatively to the wheel-crank that when its torsional strain is nil the opposite end of the pitman will require the wheel-crank to be substantially midway between the two dead-centers on that side of the wheel-bearing where the usual starting of the treadle by the operator's foot would start the wheel in the forward (rather than reverse) direction of its operating movement, it being well known that with very rare exceptions sewing-machines are intended to perform their work by revolving the wheel in one direction only, although that direction varies in machines of different make.

In lieu of a seat or rest for the body or foot of the operator, (or in addition thereto,) a handle, rod, or other appliance for hand operation may be attached to the treadle-actuating spring.

What I claim as my invention is—

1. The combination of the frame, the treadle, the tensioned torsion-spring, and the bearings, alternately over and under which the spring extends in zigzag course, substantially as and for the purposes set forth.

2. The combination of the frame, the treadle, the tensioned torsion-spring, the bearings, alternately over and under which the spring extends in zigzag course, and the brace, substantially as and for the purposes hereinbefore set forth.

3. The combination, with the eyed end of the torsion-spring, of the holder having a cavity or seat to receive the eye and a slot for the passage of the end of the spring on which said eye is formed, and the pin or plug filling said eye, substantially as and for the purposes hereinbefore set forth.

4. The combination of the eyed end of the torsion-spring, the holder having a cavity or seat to receive the eye and a slot for the passage of the end of the spring on which the eye is formed, the pin or plug filling said eye, and the case or cover to restrain the eye from lateral displacement, substantially as and for the purposes hereinbefore set forth.

5. The combination of the treadle, the crank, the pitman, and the tensioned torsion-spring connecting said pitman and treadle, substantially as and for the purposes hereinbefore set forth.

6. The combination, with a tensioned torsion-spring, two adjusting-supports at its respective ends, one tapered and the other straight and the latter threaded and nutted, and two fixed supports suitably cavitied, respectively, for receiving such adjusting-supports, substantially as and for the purposes herein set forth.

7. The combination of the frame, the flat torsion-spring, and the treadle mounted thereon so that the flat face of the spring shall be substantially at right angles to the line of pressure or weight of the limb resting on the treadle, substantially as and for the purposes hereinbefore set forth.

8. The combination, with the torsion-spring, of the brace provided with spring-tensioning devices and in itself supporting the entire spring and longitudinally extensible to accommodate itself to varying widths of frame, substantially as and for the purposes hereinbefore set forth.

CURTIS N. WILCOX.

Witnesses:
VICTOR ALMQVIST,
A. W. ALMQVIST.